Figure 1:
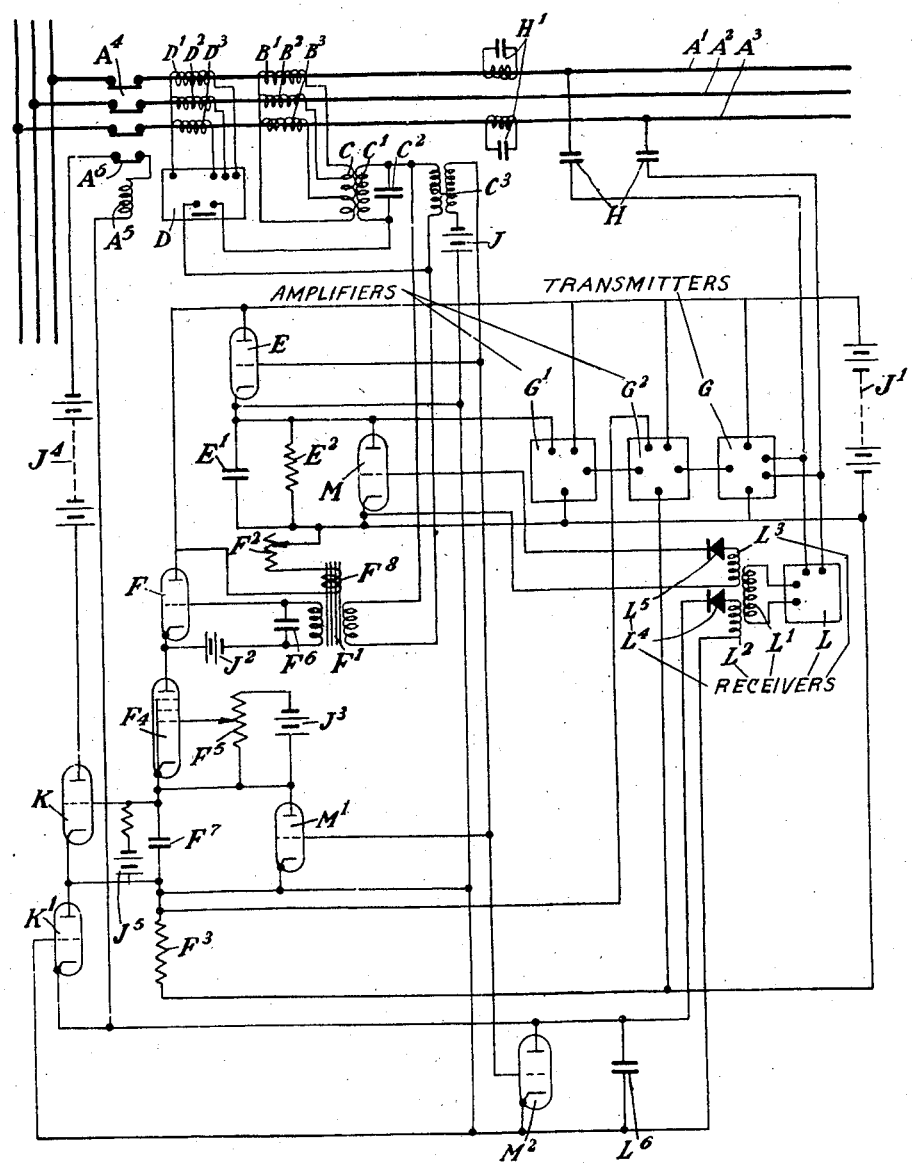

May 15, 1945.   G. W. B. MITCHELL   2,376,074
ELECTRIC PROTECTIVE ARRANGEMENT
Filed July 10, 1941   3 Sheets-Sheet 1

INVENTOR
G.W.B. MITCHELL

BY
Blair + Kilcoyne
ATTORNEYS

Patented May 15, 1945

2,376,074

UNITED STATES PATENT OFFICE 2,376,074

ELECTRIC PROTECTIVE ARRANGEMENT

Gordon William Bruce Mitchell, Newcastle-on-Tyne, England, assignor to Electrical Improvements Limited, London, England, a company of Great Britain Application July 10, 1941, Serial No. 401,843
In Great Britain July 5, 1940

21 Claims. (Cl. 175—294)

This invention relates to an electric protective arrangement for a sectionalised A. C. circuit and, although not limited thereto, is more especially applicable to the protection of overhead power lines. The well-known Merz-Price protective system, which operates by comparison of the current entering the protected section of the circuit at one end with that leaving it at the other end, is generally acknowledged to be the most satisfactory form of protection at present known, but suffers from the drawback that the arrangement necessitates the provision of pilot wires which (especially in the case of long overhead lines) entail considerable expense. Various proposals have been made to avoid the expense of pilot wires in a Merz-Price system by the use of high frequency currents superimposed on the conductors of the protected circuit, but such proposals have for the most part been attended with practical difficulties which render them not wholly satisfactory.

The present invention has for its object to provide an improved protective arrangement, which retains in a somewhat modified form the basic Merz-Price principle of comparing the incoming and outgoing currents, and which yet enables pilot wires to be dispensed with without impairing the efficiency of the protection afforded.

In the protective arrangement according to the invention each end of each protected section is provided with a current transformer, a transmitting device responsive to a predetermined instantaneous magnitude and polarity of the current transformer secondary voltage for transmitting a signal to the remote end of the section, a tripping device for cutting out the protected section at the adjacent end, and a stabilising device for preventing tripping of the circuit when the transmitted signal and the signal received from the remote end are flowing simultaneously.

The operation of the arrangement depends on the fact that so long as the protected section remains healthy the incoming and outgoing currents will be approximately equal and in phase with one another, so that the current transformer secondary voltages at the two ends will attain the critical voltage at substantially the same instant of time (if at all) whilst for all types of internal fault the instant in the A. C. cycle at which the critical voltage is reached will always be different at the two ends, so that the signals can never be transmitted simultaneously from the two ends when there is an internal fault on the protected section. Thus the comparison of incoming and outgoing currents is effected solely on a time basis and the nature and magnitude of the signals are unimportant and can be chosen to suit convenience of transmission. Conveniently the transmission of the signal is effected at relatively high frequency by superimposing it on one or more of the conductors of the protected circuit.

For the satisfactory operation of the stabilising device, two different frequencies should be employed for the signals transmitted respectively from the two ends. A beat frequency will then be produced whenever the two signals are flowing simultaneously, and the stabilising devices are preferably arranged to respond only to such frequency.

In order to determine the relative polarities of the secondary voltages at the two ends, it is preferable for the transmitting devices to include means for effecting half wave rectification of such voltages. This ensures that stabilisation will not be effected even in the case of an internal fault such that the incoming and outgoing currents are equal but 180° out of phase with one another.

Means are preferably provided for controlling the duration of the transmitted signal so as to give it an appreciable band width in relation to the A. C. cycle, the stabilising devices being operative to prevent tripping when the signal bands from the two ends overlap one another. The band width must of course be small enough to ensure that there will be no overlapping in the case of an internal fault, but in practice it is found that adequate band width to cover slight inaccuracies in the timing of the signals can be employed without risk of incorrect stabilisation.

Various arrangements can be employed for controlling the transmission of the signals. In one simple arrangement an electronic valve, preferably of the gas-discharge type, is employed for this purpose. With appropriate associated circuits, such a valve can be arranged to operate with a "trigger" action immediately the applied secondary voltage reaches the critical value with the chosen polarity, but the voltage setting of the valve is apt to alter somewhat as the result of ageing. This difficulty can be dealt with by connecting to the grid circuit of the valve a device comprising a saturable inductance, such as a choke or transformer, and a condenser so tuned as to resonate at the critical secondary voltage. In another arrangement the transmission of the signal is controlled by an oscillograph element causing a beam of light to sweep past a slit, behind which is mounted a photoelectric cell.

It will usually be preferable for the transmitting device to be normally inoperative and to be brought into an operative condition by a starting device responsive to fault conditions on the protected circuit. In order to guard against risk of inadvertent tripping as the result of the operation of the transmitting device at one end only in the event of a straight-through fault producing a current transformer secondary voltage having a value substantially equal to the critical voltage, it is preferable to provide means whereby tripping of the protected section is prevented except when the peak value of the current transformer secondary voltage exceeds a predetermined value greater than the critical voltage.

Figure 2:
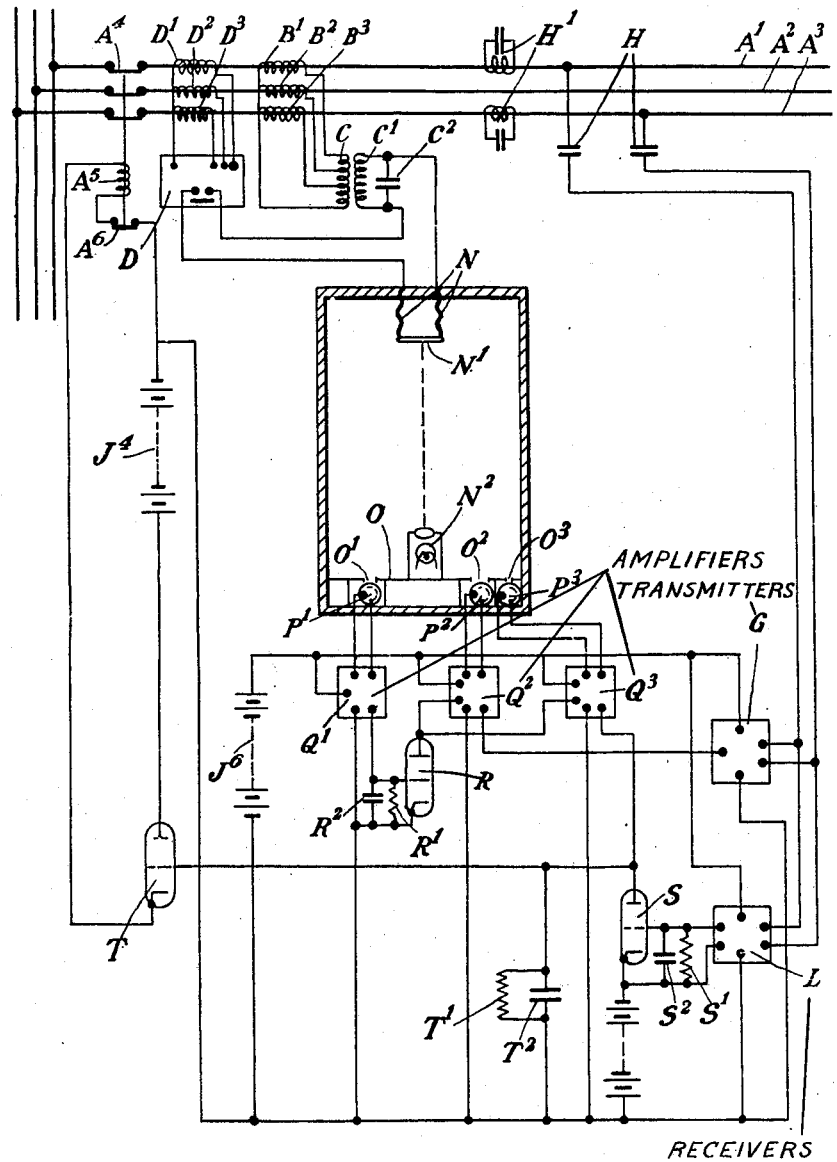
Figure 3:
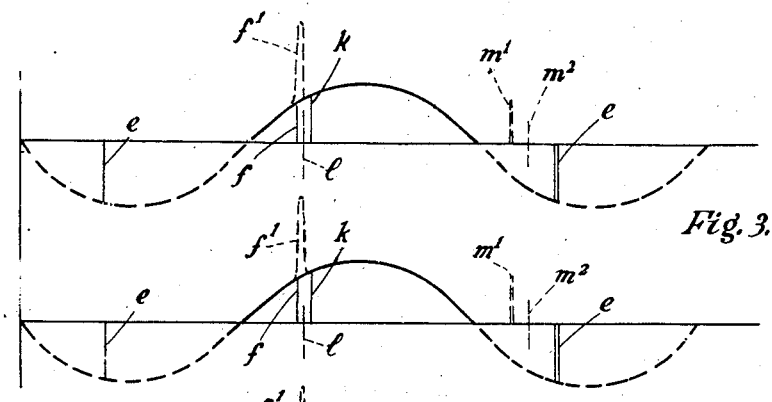
Figure 4:
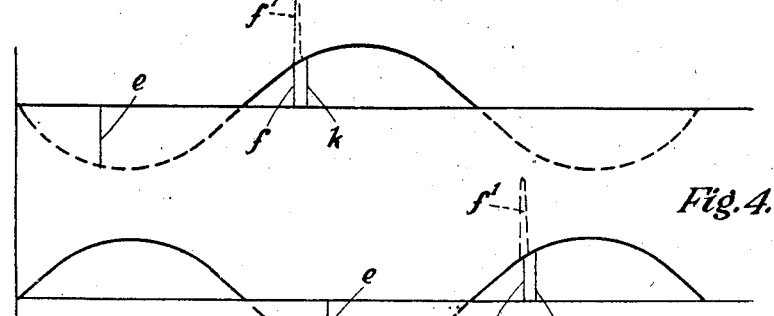
Figure 5:
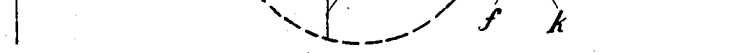

The invention may be carried into practice in various ways, but two convenient alternative arrangements according thereto, as applied to the protection of a three-phase overhead power transmission line, are illustrated diagrammatically in the accompanying drawings, in which Figures 1 and 2 are respectively circuit diagrams of the apparatus at one end of the protected section in the two arrangements, and Figures 3 to 5 are diagrams illustrating the operation of the arrangements.

In the arrangement of Figure 1 the three phase conductors $A^1A^2A^3$ are provided at each end of the section with current transformers whose secondaries $B^1B^2B^3$ are connected on one side to one another and to one end of a summation transformer primary C, whilst their free ends are connected to tapping points of the summation transformer primary. The positions of the tapping points are so chosen that, in the event of an internal fault in the protected section $A^1A^2A^3$, the secondary voltages of the summation transformers C at the two ends will be substantially different from one another either in phase or in magnitude or in both. The circuit of the summation transformer secondary $C^1$ at each end is provided with a tuning condenser $C^2$, which permits the flow of current at line frequency but filters out higher frequencies. This ensures that the secondary voltage will almost at once settle down to a more or less steady sine wave form at line frequency.

The secondary circuit of the summation transformer $CC^1$ at each end is controlled by a starting device D energised from current transformers $D^1D^2D^3$ on the protected section. This starting device, which may be of known form consisting of a combination of overload and earth leakage relays or of a negative phase sequence relay, is given a relatively low setting, so that it will operate to initiate operation of the protective apparatus, even in the event of a relatively light fault on the main circuit.

The transmission of the signal to the remote end is effected under the control of two valves E F by a transmitter G, which is provided with two amplifying stages $G^1G^2$ and acts to apply a high frequency current through suitable coupling condensers H to two of the phase conductors $A^1A^3$ of the protected section, tuned line filters $H^1$ being provided at the ends of the section to prevent the flow of the high frequency current from the section into adjacent sections. Instead of using two phase conductors for carrying the high frequency currents, a single phase conductor may be employed with an earth return circuit, but it will usually be preferable to employ two phase conductors in order to reduce interfering effects of lightning as far as possible.

The valve E consists of a gas-filled triode, whose grid circuit is connected to the secondary $C^1$ of the summation transformer through an additional transformer $C^3$ and is provided with a negative bias by means of the battery J, and whose anode circuit is supplied from a battery $J^1$ and contains a condenser $E^1$ shunted by a high resistance $E^2$. This valve is arranged to pass current at an appropriate voltage during the first negative half wave of the summation transformer secondary voltage and instantaneously charges the condenser $E^1$, the voltage across which is used to overcome a paralysing bias normally applied to the first amplifying stage $G^1$ of the transmitter, thus preparing the transmitter in readiness for operation at the critical voltage in the first half of the first positive half-wave of the secondary voltage, under the control of the valve F, which is also a gas-filled triode.

The grid circuit of the valve F obtains a negative bias from a battery $J^2$ and is connected through a transformer $F^1$ to the summation transformer secondary $C^1$. The anode circuit of the valve F is supplied from the battery $J^1$ and contains a condenser $F^7$ and resistance $F^3$ and also a constant current device, which in the example illustrated consists of a pentode $F^4$ whose grid bias battery $J^3$ is shunted by a potentiometer $F^5$. Thus the valve F operates at the critical voltage and charges the condenser $F^7$ at constant current, the rate of charging being regulated by means of the potentiometer $F^5$. This anode current flows through the resistance $F^3$, the voltage across which is used to overcome a paralysing bias normally applied to the second amplifying stage $G^2$ of the transmitter, which immediately operates to transmit the high frequency signal over the line conductors $A^1A^3$ to the remote end of the section.

This arrangement can be made highly sensitive, to operate with a trigger action at the critical voltage with a high degree of accuracy, but in course of time (unless the device is periodically reset) the voltage setting will change gradually owing to ageing of the valve F. To avoid this, it is preferable to arrange the transformer $F^1$ so that its core will become saturated at the critical voltage and to provide a condenser $F^6$ in the grid circuit which will resonate with the transformer, so as to produce an artificial peak in the voltage curve in the neighborhood of the critical voltage. This will ensure satisfactory operation at the critical voltage, notwithstanding any slight changes which may occur owing to ageing. The saturable transformer $F^1$ may be replaced, if desired, by a choke which will saturate at the critical voltage and resonate with the condenser $F^6$. The point at which resonance of the transformer $F^1$ and condenser $F^6$ takes place may be determined by means of an adjustable resistance $F^7$ which passes a small direct current from the battery $J^1$ through a coil $F^8$ wound on the core of the transformer, thus producing a uni-directional flux in the core, by which the voltage at which saturation occurs can be controlled.

Tripping of the circuit-breaker $A^4$ at the end of the protected section is effected by a trip coil $A^5$ energised from a tripping battery $J^4$ under the control of two gas-filled triode valves $KK^1$, whose anode circuits are in series in the tripping circuit. The grid circuit of the valve K, biased by a battery $J^5$, is connected across the condenser $F^7$, so that this valve will pass current as soon as the voltage across the condenser $F^7$ reaches the valve setting value. Thus there is a small time interval after the signal transmission before operation of the valve K, which as will be described later, in effect gives the transmitted signal a predetermined band width in relation to the voltage cycle. It is to be noted that the valve $K^1$ is normally unbiased, so that (unless prevented by operation of the stabilising device described below) it will immediately become conducting when anode voltage is applied to it through the valve K, and the trip coil $A^5$ will at once be energised to open the circuit breaker $A^4$ when current flows through the valves K and $K^1$. When the circuit-breaker opens, the auxiliary switch $A^6$ breaks the trip circuit and thus deionises valves K and $K^1$.

The transmitting frequencies used at the two ends of the section are slightly different from one another, for example one may be 105 kilocycles per second and the other 115 kilocycles. Thus when the transmitting devices at the two ends are operating simultaneously a current will flow in the two phase conductors $A^1A^3$ of the section at the beat frequency of 10 kilocycles. A stabilising device, including a receiver L tuned to such beat frequency, is provided at each end and is coupled to the two phase conductors $A^1A^3$ through the coupling condensers H. The output of this receiver is applied to the primary $L^1$ of a transformer having two secondaries $L^2L^3$ each associated with a rectifier $L^4$ or $L^5$. The rectified output from the secondary $L^2$ acts to apply a crippling negative bias to the grid of the valve $K^1$, and since the receiver will operate immediately when both transmitters are operating the valve $K^1$ will, in such case, be rendered inoperative within the small time interval before the valve K operates, thus preventing energisation of the trip coil $A^5$.

The rectified output from the secondary $L^3$ is at the same time applied to the grid circuit of a gas-filled triode M which instantaneously discharges the condenser $E^1$, thereby causing the transmitter to cease functioning. This in turn will cause the receiver L to cease functioning, and a condenser $L^6$ is connected across the secondary $L^2$ in order to prevent the valve $K^1$ from becoming conducting before deionisation of the valve K. Two further gas-filled triodes $M^1M^2$ are provided for discharging the condensers $F^2$ and $L^6$ at the appropriate times.

The operation of the arrangement will now be described for various fault conditions, with reference to the diagrams of Figures 3 to 5, of which Figure 3 illustrates the conditions for a fault outside the protected section, whilst Figures 4 and 5 illustrate two different possible internal fault conditions.

Taking first the case of an external fault the summation transformer secondary voltages at the two ends are equal and in phase with one another, as indicated by the two curves in Figure 3. The starting device D will operate immediately the fault occurs and the summation transformer secondary voltage will at once be applied to the grid circuits of the valves E, F, $M^1$ and $M^2$. These valves will operate at the points in the voltage cycle appropriate to their settings, but no useful purpose will be served until the valve E operates at the point $e$ in the first negative half-cycle. This valve acts, as above described, to render operative the first stage $G^1$ of the amplifier. Nothing further happens until the critical voltage is reached during the first part of the next succeeding positive half-cycle, when the saturation of the transformer $F^1$ will, by resonance with the condenser $F^6$, produce the artificial peak $f^1$ in the voltage curved and the valve F will operate exactly at the critical voltage at $f$, causing the transmitter G to function. Since the transmitters at both ends will in this instance both operate, the receiver L will also operate almost immediately, as indicated at $l$ and will at once render the valve $K^1$ inoperative, so that when the valve K operates at $k$ at the appropriate band width after $f$ determined by the time characteristics of the pentode $F^4$ and condenser $F^7$, the tripping circuit will not be completed.

The receiver L will at the same time operate the valve M to discharge the condenser $E^1$ and thereby to deenergise the transmitter G and consequently also the receiver itself, but the condensers $F^2$ and $L^6$ will remain charged for a time respectively until the valves $M^1$ and $M^2$ operate at $m^1$ and $m^2$ in the next negative half-cycle. It will be noticed that the valve $M^1$ is set to operate slightly before the valve $M^2$. This is important since otherwise the valve $K^1$ would become conducting before deionisation of the valve K and would thus wrongly operate the trip coil.

Figure 4 shows the conditions in the case of an internal fault such as to produce secondary voltages at the two ends which are approximately 180° out of phase with one another, their magnitudes being equal (as shown) or different. In this case the valve E will operate at $e$ in the first negative half-cycle at one end, whilst the corresponding point $e$ at the other end will be approximately one half-cycle later. Meanwhile the transmitter at the first end will have operated at the critical voltage at $f$, and the valve K will operate at $k$ considerably before the transmitter at the other end becomes operative. Thus the receiver L does not operate at either end, and the circuit is tripped as the result of the operation of the valve K. As soon as the circuit-breakers open, the opening of the auxiliary switch $A^6$ will deionise the valves $KK^1$. Meanwhile in the brief interval before the circuit-breakers actually open, the valve F will continue to pass current to charge the condenser $F^2$ and will be deionised when the voltage wave reaches the next zero. During the next negative half-cycle the valves $M^1$ and $M^2$ will become conducting and will discharge the condensers $F^2$ and $L^6$. The charge remaining on the condenser $E^1$ will leak gradually away through the resistance $E^2$. A similar series of operations will take place at the other end of the section in the next succeeding half-cycle, the whole protective arrangement thus being reset in readiness for further operation.

Sometimes however an internal fault will be such that the currents at the two ends are more or less in phase with one another but of different magnitude. This condition is shown in Figure 5, and it will be clear that the two signals will be transmitted in the same half-cycle but at different instants of time. It can be shown that, with suitable arrangement of the summation transformer ratios, the signals will in all such instances be sufficiently widely spaced apart to prevent the formation of the beat frequency current required to effect stabilisation. Thus tripping will occur in all cases of internal fault.

The arrangement of Figure 2 differs from that of Figure 1 primarily in the use of an oscillograph device to control the transmitter instead of the gas-filled triodes. The arrangement of the starting device and summation transformer is similar to that in Figure 1, but in this case the summation transformer secondary voltage is applied to an oscillograph element N, which carries a mirror $N^1$ and thereby acts to cause a beam of light from a source $N^2$ reflected in the mirror to sweep backwards and forwards across a slotted mask O, in such a manner that the distance of the light spot on the mask from a central zero position corresponds to the secondary voltage. The mask O has three slots in it, the first $O^1$ on one side of the zero position and the second $O^2$ and third $O^3$ on the other side thereof, with a photo-electric cell $P^1$ or $P^2$ or $P^3$ behind each slot. Each cell $P^1$ or $P^2$ or $P^3$ is connected to an amplifier $Q^1$ or $Q^2$ or $Q^3$, but the second and third amplifiers $Q^2Q^3$ are normally inoperative and are only brought into operation after the first photo-electric cell $P^1$ (i. e., that behind the first slot $O^1$) has been energised. Thus when the light beam passes the first slot $O^1$, the amplified output of the first cell $P^1$ is applied to the grid circuit of a gas-filled triode valve R and thus renders the valve conducting for a time interval sufficient to allow the secondary voltage at least to complete the next half-cycle, the time interval being determined by a resistance $R^1$ and condenser $R^2$ in the grid circuit. This valve R controls the negative supply from a battery $J^6$ to the second and third amplifiers $Q^2Q^3$ and thus renders them operative in readiness for the energisation of their associated photo-electric cells $P^2P^3$.

The second slot $O^2$ in the mask is located at a distance from the central zero corresponding to the critical voltage at which the signal transmission is to be initiated, and it will be appreciated that the arrangement just described, for rendering the second and third amplifiers $Q^2Q^3$ operative only after energisation of the first cell $P^1$, ensures that the signal transmission will be initiated only when the voltage rises past the critical value. The output of the second amplifier $Q^2$ is applied to the transmitter G proper, which acts as in the arrangement of Figure 1 to apply the high frequency signal current to the phases $A^1A^3$ of the protected section.

The output of the receiver L, which as in Figure 1 is tuned to the beat frequency of the signals transmitted from the two ends, is applied to the grid circuit of a gas-filled triode S, which is thereby rendered conducting for a time interval determined by a resistance $S^1$ and condenser $S^2$ in its grid circuit. The valve S then acts to apply a swamping negative bias to the grid circuit of a further gas-filled triode T, which would otherwise be rendered operative by the amplified output of the third photocell $P^3$. This valve T controls the tripping circuit to the trip coil $A^5$ of the circuit-breaker, and (when the swamping negative bias is not applied by the valve S) remains conducting for a time interval determined by a resistance $T^1$ and condenser $T^2$ in its grid circuit, such time interval being sufficient to ensure operation of the trip coil $A^5$ to effect tripping. Thus tripping is effected when the oscillograph beam passes the slot $O^3$, at a voltage substantially greater than the critical voltage, provided that the valve T has not meanwhile been rendered nonconducting by the swamping negative grid bias applied by the valve S if signals are transmitted simultaneously from the two ends. The time interval during which the valve S is maintained conducting is long enough to give time for the oscillograph beam to pass the third slot $O^3$.

In order to compensate for any slight differences between the oscillographs or the associated apparatus at the two ends and also for the difference in output of the two summation transformers due to the effect of power line capacity current, the second slot $O^2$ is given an appreciable width, so that the signal transmission, instead of being momentary, extends over an appreciable band of the A. C. cycle. The beat frequency will thus be set up whenever the signal bands at the two ends overlap, thus ensuring proper operation of the stabilising device even if the two transmitting devices do not operate exactly simultaneously in the event of a fault external to the protected section. The band width must not however be so large that, in the event of an internal fault, the signal transmitted from one end will still be flowing when the signal transmission from the other end is initiated. In practice, with the summation transformer arrangement above described, there will be a sufficiently long time interval between the signal transmissions from the two ends in the event of any internal fault, to permit the use of an appreciable band width for each signal without risk of inadvertent stabilisation. The size of the second slot $O^2$ in the mask is preferably adjustable, so that it can be set to suit the conditions of the particular section concerned.

The provision of the third slot $O^3$ ensures that tripping cannot take place unless the peak value of the summation transformer secondary voltage is materially greater than the critical voltage at which the signal transmission is effected. This avoids risk of inadvertent tripping which might otherwise occur, in the event of an external fault such as to produce at each end a summation transformer secondary voltage approximately equal to the critical voltage, if it should happen that one transmitting device operates and not the other owing to slight irregularities in the two devices.

In order to prevent excessive movements of the oscillograph elements under heavy fault conditions, the summation transformers are preferably arranged to saturate when a predetermined voltage is impressed on them.

It will be appreciated that the arrangements above described can be modified in various ways within the scope of the invention.

What I claim as my invention and desire to secure by Letters Patent is:

1. An electric protective arrangement for a sectionalized A. C. circuit, comprising at each end of each protected section a current transformer on the section, a transmitting device for transmitting a signal to the remote end of the section, said signal being of a duration short in comparison with a single period of the alternating current waves, means operative in accordance with the current transformer secondary voltage for causing the transmitting device to transmit its signal substantially at the instant in the A. C. cycle when such secondary voltage has a predetermined magnitude and polarity, means for cutting out such signal after brief time short in comparison with a single half cycle of the wave, a tripping device for cutting out the protected section at the adjacent end, means whereby operation of the tripping device is initiated after transmission of the signal, a stabilising device acting when operated to prevent the tripping device from cutting out the protected section, and means whereby the stabilising device is caused to operate only when the transmitted signal and the corresponding signal from the remote end are flowing simultaneously.

2. An electric protective arrangement for a sectionalized A. C. circuit, comprising a circuit-breaker at each end of the protected section, a current transformer at each end of the section, a transmitting device at each end for transmitting a signal at relatively high frequency to the remote end of the section, said signal being of a duration short in comparison with a single period of the alternating current waves and the signals transmitted from the two ends having slightly different frequencies, means whereby the transmitted signals are superimposed on at least one of the conductors of the section, means whereby each transmitting device is caused to trasmit its signal substantially at the instant in the A. C. cycle when the secondary voltage of the adjacent current transformer has a predetermined magnitude and polarity, means for cutting out such signal after brief time short in comparison with a single half cycle of the wave, a tripping device at each end operative to open the adjacent circuit-breaker at a brief time after the signal transmission from the adjacent transmitting device, and a stabilising device at each end responsive to the beat frequency between the two signal frequencies and acting to prevent tripping of the adjacent circuit-breaker when such beat frequency is set up.

3. An electric protective arrangement as claimed in claim 1, in which the means controlling the transmitting device includes means for effecting half wave rectification of the current transformer secondary voltage.

4. An electric protective arrangement as claimed in claim 2, in which the means controlling the transmitting device includes means for effecting half wave rectification of the current transformer secondary voltage.

5. The combination with the features set forth in claim 1, of means for controlling the duration of the transmitted signal, whereby such signal will have an appreciable band width in relation to the A. C. cycle, the stabilising device at each end being operative to prevent tripping whenever the signal bands from the two ends overlap.

6. An electric protective arrangement as claimed in claim 1, in which the means controlling the transmitting device includes an electronic valve of the gas discharge type whose grid circuit is fed with voltage derived from the current transformer secondary voltage whereby the valve becomes conducting when such voltage has the said predetermined magnitude and polarity, and means whereby the transmitting device is caused to transmit the signal when such valve operates.

7. An electric protective arrangement as claimed in claim 1, in which the means controlling the transmitting device includes an electronic valve of the gas discharge type whose grid circuit is fed with voltage derived from the current transformer secondary voltage whereby the valve becomes conducting when such voltage has the said predetermined magnitude and polarity, a device comprising a saturable inductance and a condenser connected to the grid circuit of the valve and tuned to resonate at such critical voltage, and means whereby the transmitting device is caused to transmit the signal when the valve operates.

8. An electric protective arrangement as claimed in claim 1, in which the means controlling the transmitting device includes an electronic valve of the gas discharge type whose grid circuit is fed with voltage derived from the current transformer secondary voltage whereby the valve becomes conducting when such voltage has the said predetermined magnitude and polarity, a second electronic valve of the gas discharge type which becomes conducting at a suitable point in the cycle of the current transformer secondary voltage of polarity opposite to that to which the first valve responds, and means whereby the transmitting device is caused to transmit the signal when the first valve operates provided that the second valve has already operated.

9. An electric protective arrangement for a sectionalised A. C. circuit comprising at each end of each protected section, a current transformer on the section, an electronic valve of the gas discharge type arranged to operate when the current transformer secondary voltage has a predetermined instantaneous magnitude and polarity, a second electronic valve of the gas discharge type arranged to operate at a suitable point of opposite polarity in the current transformer secondary voltage cycle, means whereby a signal at relatively high frequency is transmitted to the remote end of the section when the first valve operates provided that the second valve has already operated, the frequency of such signal being slightly different from that of the corresponding signal transmitted from the remote end, a stabilising device responsive to the beat frequency between such two signal frequencies whereby such device will operate only when the two signals are flowing simultaneously, a third electronic valve of the gas discharge type, means whereby the third valve is controlled by the first valve and the stabilizing device so as to operate at a predetermined brief time interval after the operation of the first valve provided that the stabilising device has not meanwhile operated, and means whereby the section is cut out at the adjacent end when the third valve operates.

10. The combination with the features set forth in claim 9, of a device comprising a saturable inductance and a condenser operatively connected to the grid circuit of the first valve and tuned to resonate at the voltage at which such valve is set to operate.

11. An electric protective arrangement as claimed in claim 1, in which the means controlling the transmitting device includes a source of light, a slotted mask, a photo-electric cell behind a slot in the mask, an oscillograph element responsive to the current transformer secondary voltage and acting to cause a beam of light from the source to sweep backwards and forwards across the mask, and means whereby the photo-electric cell causes the transmitting device to transmit the signal at the moment when the beam of light passes the slot, the slot being located in a position corresponding to the said predetermined magnitude and polarity of the current transformer secondary voltage.

12. An electric protective arrangement for a sectionalised A. C. circuit comprising at each end of each protected section, a current transformer on the section, a source of light, a slotted mask, an oscillograph element responsive to the current transformer secondary voltage and acting to cause a beam of light from the source to sweep backwards and forwards across the mask in synchronism with such voltage, a photo-electric cell behind one slot located at a position in the mask corresponding to a predetermined instantaneous magnitude and polarity of such secondary voltage, a second photo-electric cell behind a second slot located at a position in the mask corresponding to a suitable voltage of the opposite polarity, a third photo-electric cell behind a third slot located at a position in the mask corresponding to a somewhat higher voltage than the first slot but of the same polarity, means controlled by the first two photo-electric cells for transmitting a signal at a relatively high frequency to the remote end of the second when the first cell is energised provided that the second cell has already been energised, the frequency of such signal being slightly different from that of the corresponding signal from the remote end, a stabilising device responsive to the beat frequency between such two signal frequencies whereby each device will operate only when the two signals are flowing simultaneously, and means whereby the third photo-electric cell when energised causes the section to be cut out at the adjacent end provided that the stabilising device has not meanwhile operated.

13. The combination with the features set forth in claim 1, of means whereby tripping of the protected section is prevented unless the peak value of the current transformer secondary voltage exceeds a predetermined value greater than the critical voltage at which the signal is transmitted.

14. The combination with the features set forth in claim 2, of means whereby tripping of the protected section is prevented unless the peak value of the current transformer secondary voltage exceeds a predetermined value greater than the critical voltage at which the signal is transmitted.

15. The combination with the features set forth in claim 1, of means whereby the transmitting device at each end of the section is rendered normally inoperative, and a starting device at each end responsive to fault conditions on the protected circuit for bringing the transmitting device into an operative condition.

16. The combination with the features set forth in claim 2, of means whereby the transmitting device at each end of the section is rendered normally inoperative, and a starting device at each end responsive to fault conditions on the protected circuit for bringing the transmitting device into an operative condition.

17. The combination with the features set forth in claim 9, of means whereby the valves are rendered normally inoperative, and a starting device responsive to fault conditions on the protected circuit for bringing the valves into a condition ready for operation.

18. The combination with the features set forth in claim 12, of means whereby the oscillograph element is rendered normally inoperative, and a starting device responsive to fault conditions on the protected circuit for bringing the oscillograph element into a condition ready for operation.

19. An electric protective arrangement as claimed in claim 1, in which the signal transmitted from either end of the section to the other is in the form of a relatively high frequency current superimposed on at least one of the conductors of the protected circuit.

20. An electric protective arrangement as claimed in claim 1, in which two different frequencies are used for the signals transmitted respectively from the two ends of the section.

21. An electric protective arrangement as claimed in claim 1, in which two different frequencies are used for the signals transmitted respectively from the two ends of the section and the stabilizing device is arranged to be responsive to the frequency at the beat between the two signal frequencies.

GORDON WILLIAM BRUCE MITCHELL.